United States Patent [19]

Tsuchiya et al.

[11] Patent Number: 5,011,669

[45] Date of Patent: Apr. 30, 1991

[54] PROCESS FOR PRODUCING A ROD-FORM SILICA

[75] Inventors: Katsuyoshi Tsuchiya, Minamata; Kaneo Noake, Yokohama, both of Japan

[73] Assignee: Chisso Corporation, Japan

[21] Appl. No.: 469,314

[22] Filed: Jan. 24, 1990

[30] Foreign Application Priority Data

Jan. 25, 1989 [JP] Japan ............................. 1-15472

[51] Int. Cl.$^5$ ............................................. C01B 33/146
[52] U.S. Cl. ....................................... 423/338; 423/339; 501/4; 501/12; 501/133
[58] Field of Search ..................... 423/335, 338, 339; 501/12, 4, 133, 154

[56] References Cited

U.S. PATENT DOCUMENTS 4,594,330  6/1986  Suzuki et al. ...................... 423/344
4,865,829  9/1989  Hattori et al. ..................... 423/338

FOREIGN PATENT DOCUMENTS 63-85012   4/1988  Japan ................................ 423/335
3291807   11/1988  Japan .
2127002    4/1984  United Kingdom ............... 423/338

Primary Examiner—Olik Chaudhuri
Assistant Examiner—Ken Horton
Attorney, Agent, or Firm—Leydig, Voit & Mayer

[57] ABSTRACT

A process for producing a rod-form silica from a silicic acid ester according to a sol-gel process, which silica has a rod-form having a high aspect ratio and is advantageously used as a filler for resin sealants for semiconductors, is provided, which process comprises adding 35 to 150 parts by weight of a sol of a silicic acid ester to 100 parts by weight of a hydrophobic medium to form an emulsion, subjecting the emulsion to a temperature rise at two stages, the first temperature rise being by 5° to 30° C. at a rate of 10° to 200° C./min. or less and the second temperature rise being by 3° to 20° C. at a rate of 0.5° to 10° C./min., to form a rod-form silica.

9 Claims, 1 Drawing Sheet

PROCESS FOR PRODUCING A ROD-FORM SILICA

BACKGROUND OF THE INVENTION

1. Field of the Invention

This invention relates to a process for producing silica and to a rod-shaped silica formed thereby, and more particularly it relates to a process for producing a rod-form silica having a high aspect ratio.

2. Description of the Related Art

As a filler for a resin sealant for semiconductors, a crushed product of natural silica has been known. However, such a crushed silica has various problems such that it may cut the lead wire for semiconductors, when it is filled in the semiconductor, an erroneous operation may occur due to its insufficient purity, etc. In order to overcome such problems, there has been proposed a silica prepared according to a sol-gel process of adding water to a silicic acid ester to prepare a sol, followed by hydrolysis and dehydration-condensation reaction to prepare a wet gel. A silica gel is obtained by drying the wet gel, followed by sintering by heating to prepare silica. Further, a process of dispersing the sol in an organic solvent to obtain a silica in the same manner as the above (Japanese patent application laid-open No. Sho 58-176136/1983), and a process of further using a surfactant (Japanese patent application laid-open No. Sho 63-85012/1988) are disclosed.

Since the silica prepared according to a conventional sol-gel process is spherical, it is insufficient in mechanical strength for a filler of a resin sealant. Therefore, a rod-form silica having a high aspect ratio, which is expected to have a high mechanical strength in a resin sealant, has been desired.

SUMMARY OF THE INVENTION

The present invention has the following features.

(1) A process for producing a rod-form or rod-shaped silica, which comprises adding 45 to 200 parts by weight of water to 100 parts by weight of a silicic acid ester and agitating at 40° C. or lower to form a sol of the hydrolyzate of silicic acid ester, adding 35 to 150 parts by weight of the sol and a surfactant to 100 parts by weight of a hydrophobic medium with agitation to form an emulsion, subjecting the emulsion to a temperature increase at two stages, the first temperature increase being by 5° to 30° C. at a rate of 10° to 200° C./min. and the second temperature increase being by 3° to 20° C. at a rate of 0.5° to 10° C./min., to form a rod-form silica.

(2) A process for producing a rod-form or rod-shaped silica, which comprises adding water to tetramethoxysilane or tetraethoxysilane, aging the mixture at 40° C. or lower for 30 minutes or longer to obtain a sol, mixing the sol with stirring with a hydrophobic medium having a surfactant added to obtain an emulsion, raising the temperature of the emulsion by 5° to 30° C. at a rate of 10° to 200° C./min., and then further raising the temperature of the emulsion by 3° to 20° C. at a rate of 0.5° to 10° C./min., and aging the resulting material for 30 minutes or longer, to form a rod-form silica.

(3) A process for producing a rod-form silica, which comprises adding water to tetramethoxysilane or tetraethoxysilane, aging the mixture at 10° to 20° C. for 2 hours or longer to obtain a sol, mixing the sol with stirring with a hydrophobic medium having a surfactant of a HLB value of 5 to 9 added to obtain an emulsion, raising the temperature of the emulsion by 10° to 20° C. at a rate of 10° to 200° C./min., and then further raising the temperature of the emulsion by 5° to 15° C. at a rate of 1° to 2° C./min., and aging the resulting material for one hour or longer, to form a rod-form silica. The present invention is also directed to the rod-shaped silica produced by the above-summarized processes.

DETAILED DESCRIPTION OF PREFERRED EMBODIMENTS

Figure 1:
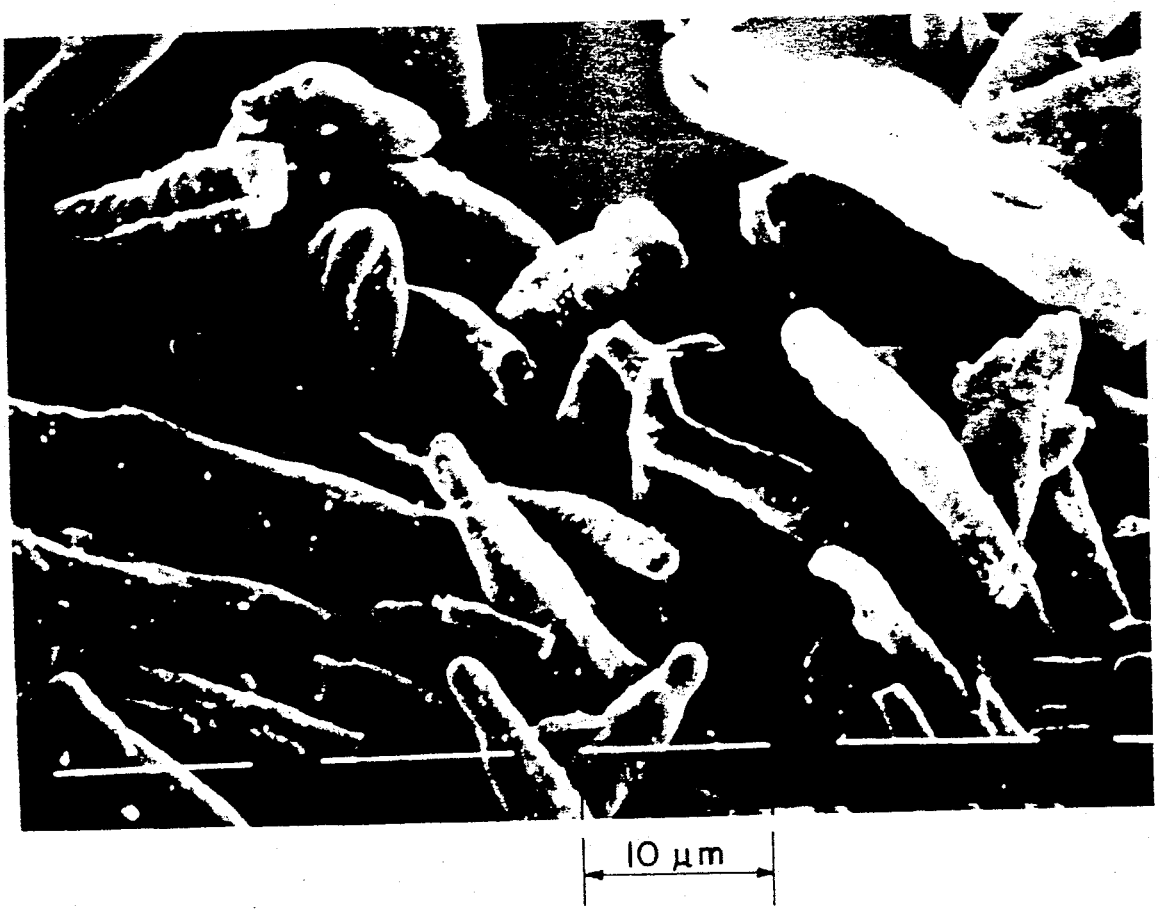
FIG. 1 shows a photograph of silica obtained in Example 1, by means of an electron microscope, wherein the length of a white line at the lower part indicates a length of 10 $\mu$m.

Examples of the silicic acid ester used in the present invention are tetramethoxysilane, tetraethoxysilane, etc.

As for the water for hydrolyzing the silicic acid ester, water, neutral ion-exchange water, distilled water or water having a pH adjusted to 3 to 8 with an inorganic acid such as hydrochloric, nitric acid, etc., an organic acid such as oxalic acid, etc. or a base such as ammonia, etc. may be used. The quantity of water for adding to and hydrolyzing the ester used is 2 mols per mol of the silicic acid ester as a theoretical value, but 45 to 200 parts by weight based on 100 parts by weight of the silicic acid ester are preferred.

According to the process of the present invention, firstly a sol is obtained by adding water to a silicic acid ester and mixing them so as to obtain a uniformly mixed state at a lower temperature. This temperature is one at which the dehydration-condensation reaction hardly advances, and it is preferably 40° C. or lower, more preferably 10° to 20° C. Further, in order to make the sol uniform at the low temperature, it is also possible to age it at a definite temperature, and it is preferred to age it for 1 to 5 hours to obtain a superior sol.

Next, the resulting sol is subjected to temperature rises at two stages. At the first stage, the sol is subjected to a rapid temperature rise by 5° to 30° C. at a rate of 10° to 200° C./min., and at the second stage, it is subjected to a temperature rise by 3° to 20° C. at a rate of 0.5° to 10° C./min. The resulting material is then aged for 30 minutes or longer. More preferably, the sol at 10° to 20° C. is subjected to a rapid temperature rise by 10° to 20° C. at a rate of 20° to 200° C./min. at the first stage, followed by a temperature rise by 5° to 15° C. at a rate of 1° to 2° C./min. at the second stage, and the resulting material is aged for one hour or longer. By such temperature rise at two stages, it is possible to rapidly carry out the dehydration-condensation reaction to obtain a rod-form silica in which a silica crystal grows in one direction.

The medium used in the present invention is a hydrophobic medium, the temperature of which is preferred to be higher than that of the sol. For example, a paraffinic hydrocarbon solvent such as kerosine, etc. is preferably used. As to the quantity of the sol used, 35 to 150 parts by weight of the sol based on 100 parts by weight of the hydrophobic medium are used. If the quantity is less than 35 parts by weight, the quantity of the dispersoids contained in the solution is so small that emulsion dispersion is not uniform and the rod-shaped silica is hardly formed, while if the quantity exceeds 150 parts by weight, the rate of temperature increase the at the first stage is so low that the rod-form silica is hardly formed.

It is preferable to add a surfactant to the hydrophobic solvent. As such a surfactant, a nonionic surfactant having a HLB value of 5 to 9 is preferred. Two or more kinds of such a surfactant may also be mixed so that a HLB value of the resulting mixture may be in the range of 5 to 9. If the HLB value is far outside the above range, the rod-shaped silica is hardly formed. Further, the quantity of the surfactant added is preferably about 2 to 5% by weight based on the weight of the hydrophobic medium.

A wet gel obtained after the above gelation reaction is filtered, washed and dried to obtain a dry silica. Further, when the dry silica is calcined in an electric furnace at about 1,000° C., it is possible to obtain a calcined silica.

According to the production process of the present invention, a sol obtained by adding water to a silicic acid ester is brought into a uniformly mixed state at a low temperature, during which hydrolysis begins, and then a hydrophobic medium having a temperature higher than that of the sol is mixed with the sol and agitated, to rapidly carry out a temperature rise at the first stage. Temperature rise at the second stage is then carried out at a rate of temperature increase within a specified range to carry out a dehydration-condensation sol-forming reaction to thereby form a silica grown in one direction and having a high aspect ratio (a ratio of length to diameter). Thus obtained rod-form silica is utilized as a filler for a resin sealant for a semiconductor and the like.

The present invention will be described in more detail by way of examples, but it should not be construed to be limited thereto.

EXAMPLE 1

Water (550 g) at 10° C. having its pH adjusted to 4.4 with nitric acid was introduced into a 2 l capacity flask. Then tetramethoxysilane (580 g) was added dropwise to the water with stirring over one hour and the resulting hydrolyzate-containing suspension was aged at 15° C. for 3 hours to form a sol.

On the other hand, kerosine (2,258 g) having sorbitan monooleate (30.4 g) and polyoxyethylene sorbitan monooleate (10.2 g) as nonionic surfactants dissolved therein was introduced to a 5 l capacity flask, to adjust the temperature to 40° C. At that time, the surfactants had a HLB value of 7.0.

Into the kerosine (2,258 g) at 40° C. being agitated by a turbine of 4 blades was fed the sol, prepared as described above, at 15° C. to effect emulsion dispersion (sol concentration: 50% by weight) and temperature rise at the first stage. The temperature of the resulting emulsion was 31° C. This emulsion was subjected to temperature rise at the second stage up to 40° C. at a rate of 1.5° C./min. The resulting material was aged at 40° C. for 2 hours. By this operation, the sol was gelled to form a rod-form silica gel.

This silica gel was filtered off from kerosine, washed with a mixed solvent of tetrahydrofuran, toluene and methanol, dried by means of a rotary evaporator and calcined at 1,000° C. in an electric furnace to obtain a rod-form silica (length: 50 μm and diameter: 10 to 5 μm). The length and diameter of the silica were measured by means of an electron microscope photograph. The resulting photograph is shown in FIG. 1.

EXAMPLE 2

Example 1 was repeated except that water (440 g), tetramethoxysilane (463 g), sorbitan monooleate (24.3 g), polyoxyethylene sorbitan monooleate (8.1 g) and kerosine (2,376 g) were used. The resulting emulsion had a sol concentration of 38 parts by weight and a temperature of 34° C. The HLB value of the surfactants at that time was 7.0. A rod-form silica gel was obtained in the same manner as in Example 1, followed by calcination. The resulting rod-form silica was 100 to 50 μm in length and 20 to 10 μm in diameter.

EXAMPLE 3

Example 1 was repeated except that the quantity of kerosine was changed to 1,566 g to obtain an emulsion having a sol concentration of 72% by weight and a temperature of 29° C. A rod-form silica gel was obtained in the same manner as in Example 1, followed by calcination to obtain a rod-form silica 10 μm in length and 3 to 1 μm in diameter.

EXAMPLE 4

Example 1 was repeated except that the number of agitating revolutions was changed to 100 rpm to obtain an emulsion having a sol concentration of 50% by weight and a temperature of 31° C. A rod-form silica gel was obtained in the same manner as in Example 1, followed by calcination. The resulting rod-form silica was 50 μm in length and 10 μm in diameter.

COMPARATIVE EXAMPLE 1

Example 1 was repeated except that water (301 g), tetramethoxysilane (318 g), sorbitan monooleate (12.1 g), polyoxyethylene sorbitan monooleate (4.0 g) and kerosine (1,947 g) were used, to effect emulsion dispersion (sol concentration: 30% by weight), thereby obtaining an emulsion having a temperature of 35° C., followed by aging the solution under this condition for 2 hours. The resulting silica gel was spherical.

This silica gel was calcined in the same manner as in Example 1 to obtain a spherical silica having a diameter of 21 μm.

COMPARATIVE EXAMPLE 2

Example 1 was repeated except that water having a pH of 4.2 (549 g), tetramethoxysilane (580 g), sorbitan monooleate (12.1 g), polyoxyethylene sorbitan monooleate (4.0 g) and kerosine (1,782 g) were used, to effect emulsion dispersion (sol concentration: 47% by weight), thereby obtaining an emulsion having a temperature of 32° C. The subsequent procedure was carried out in the same manner as in Example 1 except that the emulsion was subjected to temperature rise at the second stage up to 40° C. at a rate of 0.2° C./min. to gel a sol. The resulting gel was calcined to obtain a spherical silica having a diameter of 15 μm.

According to the production process of a rod-form silica of the present invention, since the temperature is raised at the two stages, that is, at the first stage rapidly, and at the second stage slowly, while agitating, a rod-form silica having a high aspect ratio is obtained. Thus, unlike conventional spherical silica, the silica of the present invention is expected to improve the mechanical strength of sealants. Hence it is advantageously used as a filler for resin sealants for semiconductors, etc.

What is claimed:

1. A process for producing a rod-shaped silica, which comprises adding 45 to 200 parts by weight of water to 100 parts by weight of a silicic acid ester and agitating at 40° C. or lower to form a sol of the resulting hydrolyzate of silicic acid ester, adding 35 to 150 parts by weight of the sol and a surfactant to 100 parts by weight of a hydrophobic medium to form an emulsion, and subjecting the emulsion to a temperature increase at two stages, the first temperature increase being by 5° to 30° C. at a rate of 10° to 200° C./min. or less and the second temperature increase being by 3° to 20° C. at a rate of 0.5° to 10° C./min., to form a rod-shaped silica.

2. A process for producing a rod-shaped silica according to claim 1, wherein the sol of the hydrolyzate of silicic acid ester to aged for 30 minutes or lower before the temperature increase at the first stage, and the emulsion after the temperature increase at the second stage is aged for 30 minutes or lower.

3. A process for producing a rod-shaped silica according to claim 1, wherein said silicic acid ester is tetramethoxysilane or tetraethoxysilane.

4. A process for producing a rod-shaped silica according to claim 1, wherein the first temperature increase is by 10° to 20° C. and carried out by rapidly mixing the sol with the hydrophobic medium having a higher temperature, the second temperature increase is by 5° to 15° C. at a rate of 1° to 2° C./min., and the emulsion after the second temperature increase is aged for one hour or longer.

5. A process for producing a rod-shaped silica according to claim 1, wherein said hydrophobic medium is a paraffinic hydrocarbon.

6. A process for producing a rod-shaped silica, which comprises adding water to tetramethoxysilane or tetraethoxysilane, aging the mixture at 40° or lower for 30 minutes or longer to obtain a sol, mixing the sol with stirring with a hydrophobic medium having a surfactant added to obtain an emulsion, raising the temperature of the emulsion by 5° to 30° C. at a rate of 10° to 200° C./min., and then further raising the temperature of the emulsion by 3° to 20° C. at a rate of 0.5° to 10° C./min., and aging the resulting material for 30 minutes or longer, to form a rod-shaped silica.

7. A process for producing a rod-shaped silica according to claim 6, wherein said hydrophobic medium is a paraffinic hydrocarbon.

8. A process for producing a rod-shaped silica, which comprises adding water to tetramethoxysilane or tetraethoxysilane, aging the mixture at 10° to 20° C. for 2 hours or longer to obtain a sol, mixing the sol with stirring with a hydrophobic medium having a surfactant of a HLB value of 5 to 9 added to obtain an emulsion, raising the temperature of the emulsion by 10° to 20° C. at a rate of 10° to 200° C./min., and then further raising the temperature of the emulsion by 5° to 15° C. at a rate of 1° to 2° C./min., and aging the resulting material for one hour or longer, to form a rod-shaped silica.

9. A process for producing a rod-shaped silica according to claim 8, wherein said hydrophobic medium is a paraffinic hydrocarbon.

* * * * *